(No Model.)
J. DANZ, 2d.
SUPPLEMENTAL SIDE HANDLE FOR CANS.
No. 550,442.  Patented Nov. 26, 1895.
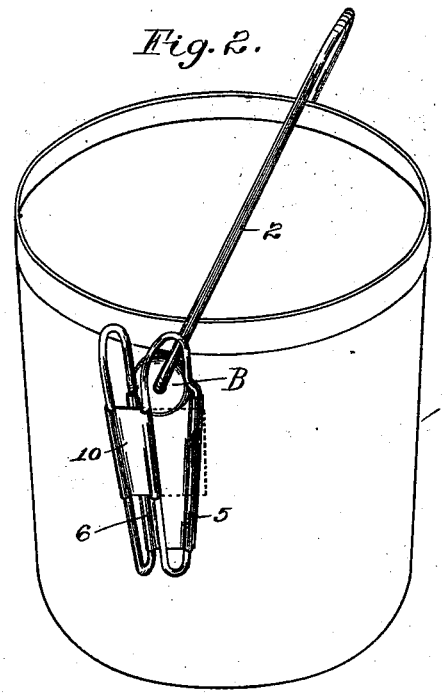
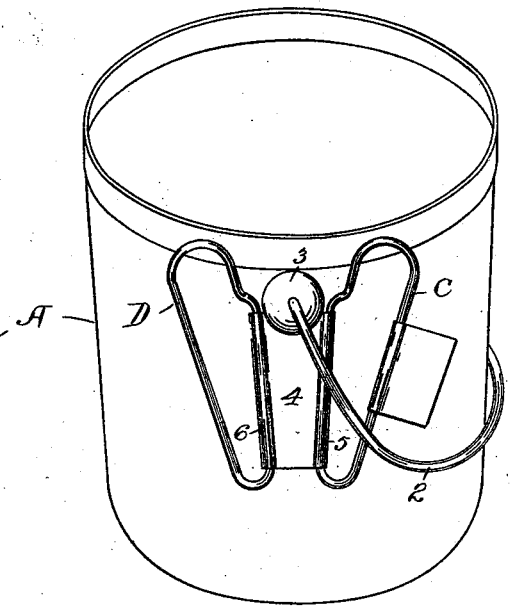
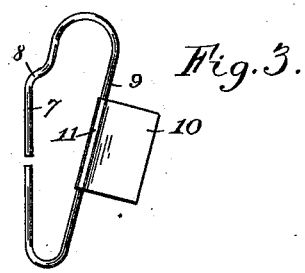
Witnesses:
F. S. Bradbury.
H. S. Johnson.
Inventor:
Jacob Danz 2nd.
per: T. D. Merwin
Attorney.

UNITED STATES PATENT OFFICE.

JACOB DANZ, 2D, OF ST. PAUL, MINNESOTA.

SUPPLEMENTAL SIDE HANDLE FOR CANS.

SPECIFICATION forming part of Letters Patent No. 550,442, dated November 26, 1895.

Application filed March 30, 1895. Serial No. 543,859. (No model.)

*To all whom it may concern:*

Be it known that I, JACOB DANZ, 2d, of St. Paul, Ramsey county, Minnesota, have invented certain Improvements in Supplementary Side Handles for Pails, of which the following is a specification.

My invention relates to improvements in attachments for sheet-metal vessels, such as the lard-pails of commerce, its object being to provide a supplementary handle therefor, permanently attached thereto, which can be folded flat against the surface of the pail for the purpose of shipment, but which can be turned outward and used as a supplementary handle, thus changing the character of the vessel from a pail to a dipper.

To this end my invention consists in permanently hinging in a substantially vertical position a pair of wire loops, which are free to be folded away from each other against the sides of the pail, but when turned outward toward each other may be grasped by the hand and constitute a firm handle. I also prefer to attach to one of these members a sheet-metal strip, which can be folded around both members when turned outward, so as to make the handle a permanent one.

My invention further consists in the construction and combination hereinafter particularly described and claimed.

In the accompanying drawings, forming part of this specification, Figure 1 is a perspective view of a pail shown fitted with my improved supplementary handle, the members being shown folded back against the side of the pail. Fig. 2 is a similar view showing the members of the handle closed together and the binding-strip wound about them to secure them permanently together, and Fig. 3 is a detail of one of the members of the supplementary handle and attached binding-strip shown detached from the pail.

In the drawings, A represents the sheet-metal pail, having the bail 2. The bail-ear B is formed preferably with the boss or rounded projection 3, in which the end of the bail is fitted, and has also a downwardly-projecting part 4, secured upon the side of the pail and having the folds or hems 5 and 6 on its edges slightly diverging from each other toward the top of the pail. Carried by these hems or folds are the members C and D of the supplementary handle. These members are preferably harp-shaped loops, having a straight part 7, which turns as a pintle in the hems of the part 4. At the end of this part the wire is bent outwardly at nearly a right angle, forming a shoulder 8, which is adapted to strike against the projecting part 3 of the ear, so as to limit its movement toward the other member. The wire of the member is then bent downward, forming the handle part 9. Each member is thus permanently hinged to the side of the pail and may be readily turned against its side, as shown in Fig. 1, or outward at substantially right angles with the side, as shown in Fig. 2.

In order to constitute the rigid handle, I prefer to secure to one of the members a strip of sheet metal 10, having a hem 11, folded around the handle part of the member and extending out from it, as shown in Fig. 3, while the pail is being shipped. This strip is adapted to be folded about the other member, so as to bind them closely together to make a permanent handle, as shown in Fig. 2.

I claim—

1. In combination with a pail, its bail ear provided with downwardly projecting folds or hems, and the similar harp shaped wire loops turning in said folds as hinges and bearing against the sides of said ear when turned outward.

2. As an improved article of manufacture a bail ear, having arranged upon opposite sides thereof a pair of similar hinged wire loops, and being provided with a boss or projection to prevent said loops closing together when turned outward.

3. In a bail ear for pails, the combination with the body provided with a socket for a bail, the boss thereon, the downwardly projecting hems or folds upon opposite sides thereof, and the loops turning in said folds as hinges and adapted to fold against the side of the pail or to be turned outward in vertical position so as to bear against the sides of said boss.

4. The combination with the pail, of the pair of similar wire loops hinged thereto in substantially vertical and parallel position, and the metallic tie attached to one of said loops for securing them to each other.

5. The combination with the pail, and the pair of similar loops hinged thereto in substantially vertical and parallel position, of the interposed stop limiting their approach to each other, and the sheet metal strip for permanently securing them together.

6. In combination with the pail, the bail ear having a downwardly projecting part, having its vertical edges formed with folds, the pair of similar wire loop shaped members turning in said folds as hinges, and adapted to be folded against the sides of the pail, or to be turned outwardly to bear against the sides of the ear, and the sheet metal strip secured at one end to one of said loops and adapted to be bent around the other.

In testimony whereof I affix my signature in presence of two witnesses.

JACOB DANZ, 2D.

Witnesses:
H. S. JOHNSON,
MINNIE THAUWALD.